United States Patent
Lockridge

(10) Patent No.: US 8,468,570 B2
(45) Date of Patent: Jun. 18, 2013

(54) METHOD AND SYSTEM FOR MEMORY PVR FUNCTIONS IN A BROADCAST ENVIRONMENT

(75) Inventor: Terry Wayne Lockridge, Indianapolis, IN (US)

(73) Assignee: Thomson Licensing, Issy-les-Moulineaux (FR)

( * ) Notice: Subject to any disclaimer, the term of this patent is extended or adjusted under 35 U.S.C. 154(b) by 1364 days.

(21) Appl. No.: 10/526,532

(22) PCT Filed: Sep. 5, 2003

(86) PCT No.: PCT/US03/27989
§ 371 (c)(1),
(2), (4) Date: Mar. 2, 2005

(87) PCT Pub. No.: WO2004/023786
PCT Pub. Date: Mar. 18, 2004

(65) Prior Publication Data
US 2006/0130094 A1    Jun. 15, 2006

Related U.S. Application Data

(60) Provisional application No. 60/408,390, filed on Sep. 5, 2002.

(51) Int. Cl.
*H04N 7/173* (2011.01)
(52) U.S. Cl.
USPC ............ 725/89; 725/88; 725/93; 725/102
(58) Field of Classification Search
USPC ... 725/82, 88, 89, 91, 92, 93, 94, 102; 386/86
See application file for complete search history.

(56) References Cited

U.S. PATENT DOCUMENTS

| 546,145 A | 12/1894 | Gibbs | |
|---|---|---|---|
| 5,371,532 A * | 12/1994 | Gelman et al. | 725/88 |
| 5,442,390 A * | 8/1995 | Hooper et al. | 725/90 |

(Continued)

FOREIGN PATENT DOCUMENTS

| JP | H7-264573 | 12/1894 |
|---|---|---|
| JP | 7248972 | 9/1995 |

(Continued)

OTHER PUBLICATIONS

Search Report Dated Apr. 30, 2004.

(Continued)

*Primary Examiner* — Brian Pendleton
*Assistant Examiner* — Jonathan V Lewis
(74) *Attorney, Agent, or Firm* — Robert D. Shedd; Vincent E. Duffy; Michael A. Pugel

(57) ABSTRACT

A method and system for providing personal video recording functions to a client viewing a broadcast program in a multi-client network. To provide the PVR functions, predetermined storage limits are allocated for each client in a storage device on the network. Each client is permitted to execute the PVR functions if the client's stored broadcast programming has not reached the client's predetermined storage limit. Otherwise, the client is only permitted to view the broadcast program in real time or the stored broadcast program. A client may clear space in the client's allocated portion of the storage device by fast-forwarding through stored broadcast programming.

10 Claims, 3 Drawing Sheets

U.S. PATENT DOCUMENTS

| | | | |
|---|---|---|---|
| 5,453,779 A | | 9/1995 | Dan et al. |
| 5,572,645 A | | 11/1996 | Dan et al. |
| 5,583,995 A | * | 12/1996 | Gardner et al. ............... 709/219 |
| 5,689,298 A | * | 11/1997 | Nishimura et al. ............ 725/88 |
| 5,721,829 A | * | 2/1998 | Dunn et al. ..................... 725/87 |
| 5,974,217 A | | 10/1999 | Haraguchi |
| 6,172,712 B1 | * | 1/2001 | Beard ............................ 348/552 |
| 6,598,228 B2 | | 7/2003 | Hejna, Jr. |
| 6,642,939 B1 | | 11/2003 | Vallone et al. |
| 6,728,776 B1 | * | 4/2004 | Colbath ......................... 709/231 |
| 6,769,127 B1 | * | 7/2004 | Bonomi et al. ................. 725/39 |
| 6,993,786 B1 | * | 1/2006 | Maruya et al. ................. 725/88 |
| 7,143,430 B1 | * | 11/2006 | Fingerman et al. ............. 725/87 |
| 7,403,935 B2 | * | 7/2008 | Horvitz et al. .................... 707/1 |
| 8,056,106 B2 | * | 11/2011 | Rodriguez et al. ............. 725/88 |
| 8,272,019 B2 | * | 9/2012 | Ellis et al. ....................... 725/93 |
| 2002/0092021 A1 | * | 7/2002 | Yap et al. ........................ 725/55 |
| 2002/0194609 A1 | * | 12/2002 | Tran ................................ 725/95 |
| 2003/0228140 A1 | * | 12/2003 | Bullock et al. ................ 386/125 |
| 2004/0006698 A1 | | 1/2004 | Apfelbaum |
| 2004/0123323 A1 | * | 6/2004 | Russo ............................. 725/88 |
| 2005/0172326 A1 | * | 8/2005 | Jerding et al. ................. 725/116 |
| 2005/0262539 A1 | | 11/2005 | Barton et al. |
| 2006/0271980 A1 | * | 11/2006 | Mankovitz ...................... 725/90 |

FOREIGN PATENT DOCUMENTS

| | | |
|---|---|---|
| JP | H7-264531 | 9/1995 |
| JP | H11-500289 | 2/1997 |
| JP | H11-501786 | 12/1997 |
| JP | 2001-527709 | 8/1998 |
| JP | 2001-520829 | 10/1998 |
| JP | 200128741 | 1/2001 |
| JP | 2003521851 | 7/2003 |
| WO | WO 98/48566 | 10/1998 |
| WO | WO 00/60591 A1 | 10/2000 |
| WO | WO 00/60820 | 10/2000 |
| WO | WO 00/60873 A1 | 10/2000 |
| WO | WO 01/93587 | 12/2001 |

OTHER PUBLICATIONS

Correspondence from JP agent, Itoh International Patent Office, dated Nov. 20, 2009, p. 1.

* cited by examiner

METHOD AND SYSTEM FOR MEMORY PVR FUNCTIONS IN A BROADCAST ENVIRONMENT

This application claims the benefit, under 35 U.S.C. §365 of International Application PCT/US03/27989, filed Sep. 5, 2003, which was published in accordance with PCT Article 21(2) on Mar. 18, 2004 in English and which claims the benefit of U.S. provisional patent application No. 60/408,390, filed Sep. 5, 2002.

FIELD OF THE INVENTION

The present invention relates to providing video services in a Multi-Dwelling or Multi-Tenant network.

BACKGROUND OF THE INVENTION

To support personal video recording ("PVR") functions for all the clients in a Multi-Dwelling or Multi-Tenant ("M×U") network one of two approaches are conventionally utilized. First, each client may be provided with a hard disk drive ("HDD") at the client's dwelling unit. However, a major drawback is the cost incurred by the M×U network provider in providing HDDs for each dwelling unit. Second, the consumer premises equipment ("CPE") device located at each dwelling unit may be provided access to a large storage device located at a head-end unit of the M×U network provider. Traditionally, the storage device is large enough to store all the programs ordered by the clients in the M×U network and to allow the clients use PVR functions (e.g., randomly rewinding, pause, etc . . . ) when viewing the stored programs. However, similar to the drawback encountered under the first approach the use of such a large storage device is also very expensive. The present invention is directed towards overcoming these drawbacks.

SUMMARY OF THE INVENTION

The present invention is used in an environment where low cost network set top boxes are connected to video server. The present invention reduces the cost of the set top boxes by providing a hard drive at a Mini-Headend of the M×U network provider and eliminating the need for hard drives in the set top boxes. More particularly, a method and system for providing personal video recording functions ("PVR") functions to a client viewing a broadcast program in a multi-client network. To provide the PVR functions, predetermined storage limits are allocated for each client in a storage device on the network. Each client is permitted to execute the PVR functions if the client's stored broadcast programming has not reached the client's predetermined storage limit. Otherwise, the client is only permitted to view the broadcast program in real time or the stored broadcast program. A client may clear space in the client's allocated portion of the storage device by fast-forwarding through stored broadcast programming.

The characteristics and advantages of the present invention will become more apparent from the following description, given by way of example.

DETAILED DESCRIPTION OF THE PREFERRED EMBODIMENT

Figure 1:
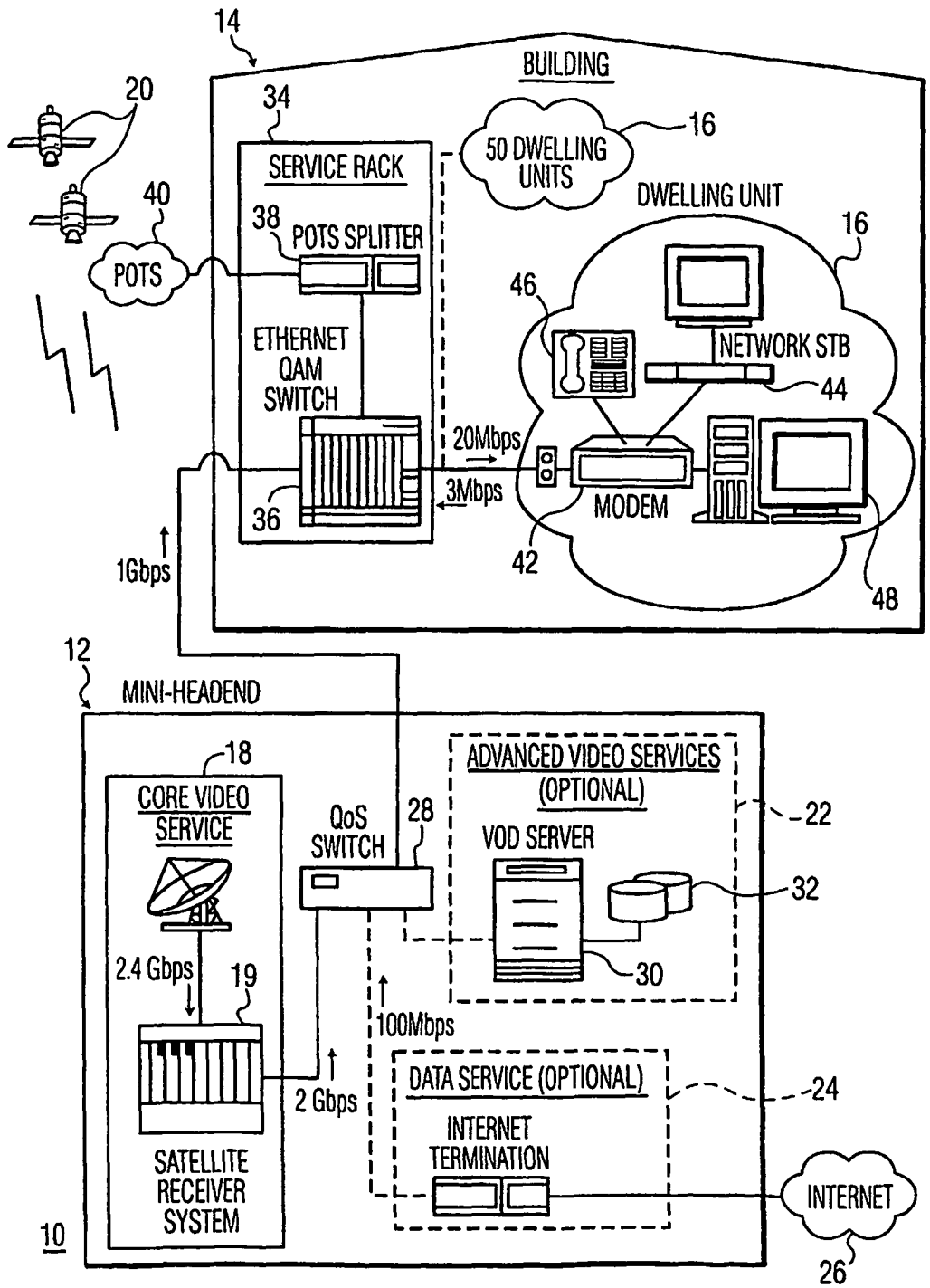
FIG. 1 is an exemplary system diagram of the present invention.

Referring now to FIG. 1, an exemplary system 10 that operates according to the principles of the present invention is shown. System 10 is an integrated digital data system to provide broadband, digital video, and services to multiple users. More specifically, system 10 integrates quality audio and video with digital IP data services for multiple users. This system design provides a platform to launch a variety of cost effective digital services. System 10 is designed to be scalable, so different digital data services can be added incrementally.

System 10 includes a Mini-Headend Unit 12 where digital audio, video, and data services are received, aggregated together and distributed, and a Multi-Dwelling Unit and/or Multi-Tenant Unit ("M×U") network 14. Network 14 may be located in one or more apartment buildings, hotels, or any other structure where multiple clients desiring digital audio, video, and data services reside.

Mini-Headend Unit 12 is responsible for receiving data, providing Quality of Service ("QoS"), providing customized services, and routing data to dwelling units 16 in the M×U network 14. Mini-Headend unit 12 includes a Core Video Service System 18, an Advanced Video Services System 22, a Data Service System 24 communicatively connected to the Internet 26, and a QoS switch 28.

Core Video Service System 18 preferably includes a Satellite Receiver System 19 communicatively connected to satellites 20. Satellite Receiver System 19 is able to scale the number of streams received from satellites 20 in accordance with the number of clients desiring service. More specifically, Satellite Receiver system 18 runs a multi-cast server to allow network set top boxes 44 in the dwelling units 16 to request digital data streams. Satellite Receiver system 18 scales by the number of tuning blades in the chassis until all transponders for the satellite are being received. A fully-loaded chassis having 60 transponders is able to handle an input data rate of 2.4 Gbps. At this point, the chassis is able to handle n users by accepting a new user request to the appropriate multi-cast group. Satellite Receiver System 19 is able to receive satellite signals and output IP packets at a data rate of 2 Gbps to multi-cast aware switch 28. More specifically, The IP packets that are sent out use QoS (as set forth in standards IEEE 802.1p (entitled "Traffic Class Expediting and Dynamic Multicast Filtering") and IEEE 802.1q (entitled "Virtual LANs")) to insure that the packets are delivered promptly. The network interface on the Satellite Receiver System 19 is a 1 Gbps Ethernet port and is expandable to two 1 Gbps Ethernet ports. A management system of the Satellite Receiver 19 accepts requests for programs from clients. The management system allows clients to select a satellite, transponder, and program IDs, and allows the Satellite Receiver System 19 to provide specific program streams to the client. The management system also supports multi-casting to save bandwidth. Although satellite receiver system 19 and satellites 20 are illustrated as the content delivery medium in FIG. 1, the use of other media (e.g., cable, fiber, etc.) for delivering content is considered within the scope of the invention.

Advanced Video Services system 22 is a platform that works in conjunction with the Satellite Receiver 19 to enable additional digital video services. Advance Video Services system 22 is scaled according to the number of clients using the service. For example, system 22 may require more servers 30 as the number of clients increases. The types of services provided are, inter alia, Video On Demand, Near Video On Demand, Limited Video On Demand, Nielsen Ratings, Time Shift, Auto Record, Personal Video Recording ("PVR"), and the like. Advanced Video System 22 includes a Conditional Access System (not shown) that is used for program streams that are recorded to hard drive(s) 32. When recording, the original program stream received from Satellite Receiver System 19 is decrypted, picture data is extracted, and a new program stream (containing the extracted picture data) is encrypted and stored onto hard drive(s) 32. The network provider's conditional access system is terminated at the Advanced Video System Server 30 and the new conditional access system is used thereafter.

Data Service System 24 is scaled according to the number of clients using internet service and the required speed or bandwidth of the internet service.

Mini-Headend unit 12 may include a Gigabit QoS Ethernet switch 28 (necessary for medium to large systems) that is scalable and can be removed in small installations. As known by those skilled in the art, some of the issues that are considered when selecting switch 28 are the type of services provided and how many dwelling units 16 in M×U network 14 need to be supported. Switch 28 provides connectivity between Satellite Receiver System 19, Advance Video Services system 22 and Data Services System 24. Switch 28 also provides connectivity from the Mini-Headend unit 12 to the M×U network 14. Switch 28 supports full-duplex Gigabit Ethernet interfaces and is scalable to support systems of various sizes. Switch 28 supports the QoS set forth in the IEEE 802.1p and 802.1q standards. Having QoS facilitates the communication between switch 28 and Advanced Video Services System 22 and Data Services System 24. More specifically, video data from Video Services system 18 and Advanced Video Services system 22 is given a higher priority than data from Data Service system 24. For example, when video data and internet data is simultaneously requested, video data is transmitted first and the internet data is either transmitted simultaneously if enough bandwidth is available or transmitted at a later time when sufficient bandwidth becomes available.

M×U network 14 includes a service rack 34 and dwelling units 16. Service rack 34 is scalable according to the number of dwelling units 16 in the M×U network 14 and is located in the central point where the phone lines in the M×U network 14 come together. The number of M×U networks 14 in system 10 dictates the number of service racks 34 required. Preferably, a service rack 34 is provided for each network 14 (e.g., building) in a multi-network environment (e.g., a multiple building complex). Each service rack 34 includes a VDSL switch 36 that uses a Plain Old Telephone Service ("POTS") Splitter 38 to combine POTS service 40 with the digital video, audio, and data received from the QoS switch 28 of Mini-Headend 12 via a 1 Gbps phone line. Although VDSL switch 36 is illustrated as being an Ethernet QAM switch, it should be noted that the use of any other Ethernet switch is considered within the scope of the present invention.

In system 10 each Dwelling Unit 16 that has subscribed to digital services is required to have a consumer premises equipment ("CPE") device. The CPE device for a given dwelling unit 16, depending on the client's service subscription, may include a modem 42, a network set top box ("STB") 44, both a modem 42 and a STB 44, or an integrated modem and STB unit (not shown). The exemplary system 10 of the present invention requires at least the modem 42 for the reception of digital data, audio, and video services. Modem 42 is connectable to switch 36 via phone lines and terminates the VDSL line. Modem 42 also has a POTS Splitter (not shown) and a connection for phone services 46. Modem 42 has an Ethernet port to provide computers 48 internet access and network STBs 44 access to audio and video services.

Although phone lines are shown as being used as the communication medium between the dwelling units 16 and the Mini-Headend unit 12, cable and wireless networks are considered within the scope of the invention.

In summary, system 10 provides the architecture to deliver, inter alia, digital audio, digital video, high-speed Internet access, telephony services, security services, and the like to a client residing at a dwelling unit 16, and provides a revenue stream and a platform to add incremental or new services to the system provider.

Figure 2:
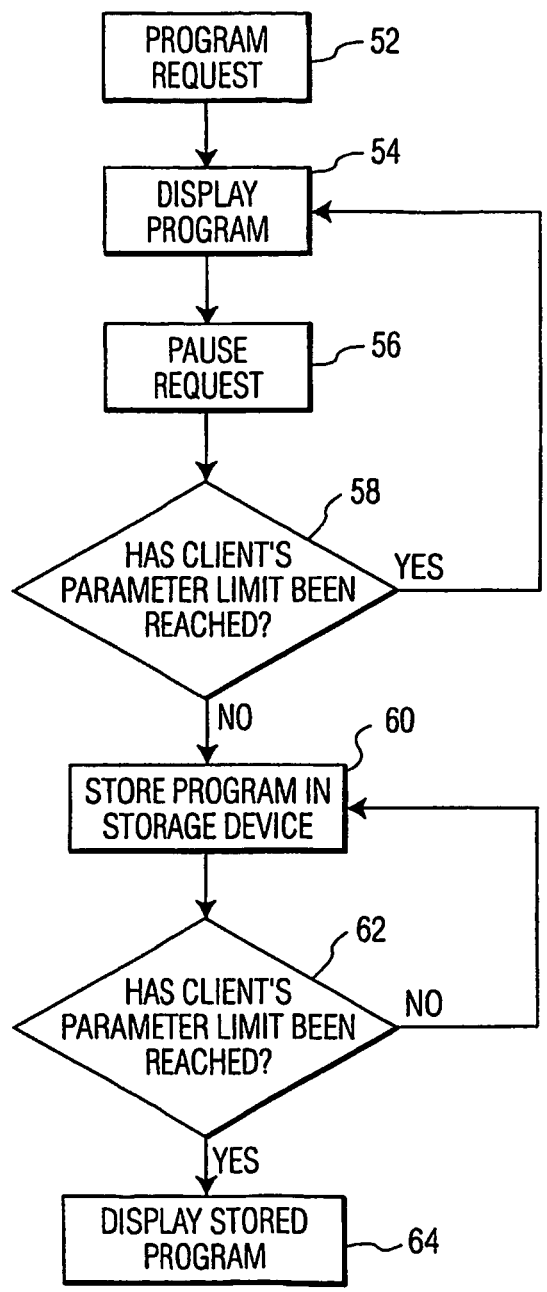
FIG. 2 is a flow chart illustrating a PVR pause process for broadcast programs of the present invention.

Referring now to FIG. 2, a personal video recording ("PVR") memory management process 50 of the present invention is shown. After a client, at step 52, requests, via STB 44, the display of a broadcast program (e.g., a program received from Core Video Service system 18), Mini-Headend unit 12 instructs the Satellite Receiver system 19 to deliver the requested program to the requesting STB 44 via switches 28 and 36. Upon receipt of the program, STB 44, at step 54, displays the program to the client. During the viewing of the program the client may, at step 56, attempt to pause the program. Upon receipt of a pause request from STB 44, Mini-Headend unit 12, at step 58, determines whether the client's parameter limit has been reached. The parameter limit represents the amount of storage space allocated to the client on hard drives 32. VOD server 30 allocates the amount of storage for each client. It should be noted that each client may receive the same amount of storage space or different clients may receive different amounts of storage space. For example, the amount of storage space allocated may be based on the type of subscription a client has or a fee paid by a client. If so, the Mini-Headend unit denies the pause request and STB 44 returns to step 54 and continues to display the program. If not, Mini-Headend unit 12 instructs switch 28 to route the program to the VOD server 30 and instructs VOD server 30, at step 60, to store the program on a storage device (e.g., hard drive 32). Mini-Headend unit 12 then, at step 62, monitors the client's parameter limit and, if the limit is not reached, continues to pause the display of the program to the client and store the program in the storage device. However, if the parameter limit is exceeded Mini-Headend unit 12, at step 64, instructs VOD server 30 to deliver the stored program to the client and to continue storing the broadcast program in the hard drive by writing over the portion of the stored program that has been delivered to the client. Mini-Headend unit 12 simultaneously instructs the STB 44 to resume the display of the program.

Figure 3:
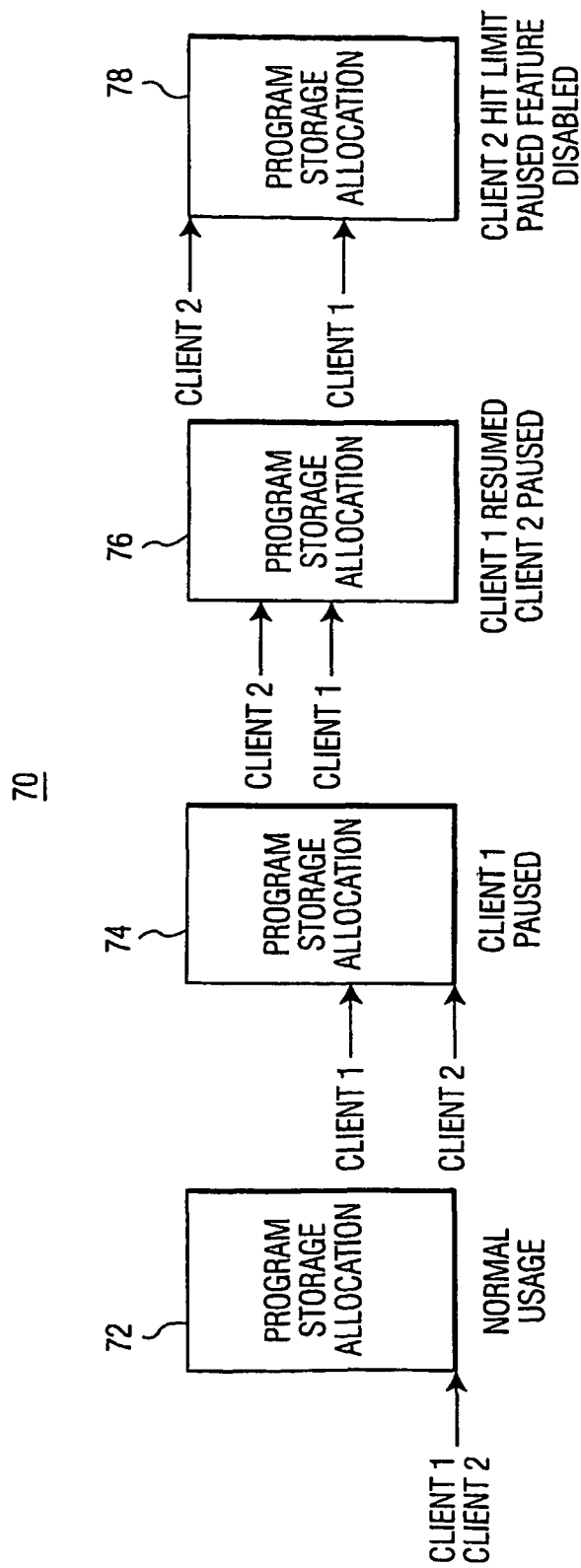
FIG. 3 is a block diagram illustrating an exemplary pause feature of the present invention.

Referring now to FIG. 3, an illustration of a PVR pause/rewind storage management process 70 wherein two clients are viewing the same program stream is shown. At block 72, clients 1 and 2 request the same program stream. At block 74, as both clients are viewing the stream, client 1 pauses its view. Client 2 is still receiving the program stream. Since client 1 paused the stream, the receiver system is sending the data to a storage device (as shown by the change in the program storage allocation for client 1. At bock 76, client 2 decides to pause and client 1 resumes viewing. Both clients are viewing the program stream in their own time domain (i.e., client 1 is viewing a stored portion of the program stream and client 2 was, until the pause, viewing the program stream in real time). For various reasons storage pace on hard drives 32 may be at a premium. When this is the case, Mini-Headend unit 12 sets a parameter indicating how much storage per client to allocate for a paused program stream. At block 78, client 2 has remained paused. As the stored program hits the parameter limit, the pause feature is disabled for client 2, and client 2 is forced to view the stored program in a broadcast model (i.e., no pause or rewind permitted). client 1, who has been viewing the program during this period, can still pause rewind the program. Both clients can fast forward through the stored program and join in viewing the original broadcast. If client 2 does so, the pause feature will be re-enabled for client 2.

Although the present invention has been described in conjunction with the embodiments disclosed herein, it should be understood that the foregoing description is intended to illustrate and not limit the scope of the invention as defined by the claims.

The invention claimed is:

1. A method of providing a pause function for a broadcast program in a multi-client network, the method comprising:
   allocating predetermined storage limits in a storage device for a plurality of clients on the network;
   delivering first portions of a broadcast program to a client;
   receiving a pause request from the client;
   determining if the client's stored broadcast programming has reached the client's predetermined storage limit;
   pausing the delivery of the broadcast program to the client and delivering second portions of the broadcast program to a storage device responsive to receipt of the pause request and a determination that the client's stored broadcast programming has not reached the client's predetermined storage limit;
   delivering the stored second portions of the broadcast program from the storage device to the client while delivering third portions of the broadcast program to the storage device responsive to a further determination that the client's stored broadcast programming has reached the client's predetermined storage limit;
   receiving a rewind request from the client; and
   permitting the client to rewind through the stored second portions of the broadcast program if the client's stored broadcast programming has not reached the client's predetermined storage limit.

2. The method of claim 1, further including the steps of:
   receiving a play request from the client; and
   delivering the stored second portions of the broadcast program to the client.

3. The method of claim 1 wherein the step of allocating predetermined storage limits for the plurality of clients includes allocating identical storage limits for the plurality of clients.

4. The method of claim 1 wherein the step of allocating predetermined storage limits for the plurality of clients includes allocating different storage limits for some of the plurality of clients.

5. A system for providing a pause function for a broadcast program in a multi-client network, the system comprising:
   a processor:
   said processor performing the steps of:
   allocating predetermined storage limits in a storage device for a plurality of clients on the network;
   delivering first portions of a broadcast program to a client;
   receiving a pause request from the client;
   determining if the client's stored broadcast programming has reached the client's predetermined storage limit;
   pausing the delivery of the broadcast program to the client and delivering second portions of the broadcast program to storage responsive to receipt of the pause request and a determination that the client's stored broadcast programming has not reached the client's predetermined storage limit;
   delivering the stored second portions of the broadcast program from the storage to the client while delivering third portions of the broadcast program to the storage responsive to a further determination that the client's stored broadcast programming has reached the client's predetermined storage limit;
   receiving a rewind request from the client; and
   permitting the client to rewind through the stored second portions of the broadcast program if the client's stored broadcast programming has not reached the client's predetermined storage limit.

6. The system of claim 5, wherein the processor further performs the steps of:
   receiving a play request from the client; and
   delivering the stored second portions of the broadcast program to the client.

7. The system of claim 5 wherein the processor further performs the steps of:
   allocating predetermined storage limits for the plurality of clients including allocating identical storage limits for the plurality of clients.

8. The system of claim 5 wherein the processor further performs the steps of:
   allocating predetermined storage limits for the plurality of clients including allocating different storage limits for some of the plurality of clients.

9. A method of providing a pause function for a broadcast program in a multi-client network, the method comprising:
   allocating predetermined storage limits in a storage device for a plurality of clients on the network;
   delivering first portions of a broadcast program to a client;
   receiving a pause request from the client;
   determining if the client's stored broadcast programming has reached the client's predetermined storage limit;
   pausing the delivery of the broadcast program to the client and delivering second portions of the broadcast program to a storage device responsive to receipt of the pause request and a determination that the client's stored broadcast programming has not reached the client's predetermined storage limit;
   delivering the stored second portions of the broadcast program from the storage device to the client while delivering third portions of the broadcast program to the storage device responsive to a further determination that the client's stored broadcast programming has reached the client's predetermined storage limit;
   receiving a fast forward request from the client;
   fast forwarding through the stored second portions of the broadcast programming; and
   permitting the client to pause the display of the program until the client's predetermined storage limit is again reached.

10. A system for providing a pause function for a broadcast program in a multi-client network, the system comprising:
    a processor:
    said processor performing the steps of
    allocating predetermined storage limits in a storage device for a plurality of clients on the network;
    delivering first portions of a broadcast program to a client;
    receiving a pause request from the client;
    determining if the client's stored broadcast programming has reached the client's predetermined storage limit;
    pausing the delivery of the broadcast program to the client and delivering second portions of the broadcast program to storage responsive to receipt of the pause request and a determination that the client's stored broadcast programming has not reached the client's predetermined storage limit;

delivering the stored second portions of the broadcast program from the storage to the client while delivering third portions of the broadcast program to the storage responsive to a further determination that the client's stored broadcast programming has reached the client's predetermined storage limit;

receiving a fast forward request from the client;

fast forwarding through the stored second portions of the broadcast programming; and permitting the client to pause the display of the program until the client's predetermined storage limit is again reached.

* * * * *